Aug. 11, 1936.     J. ERICKSON     2,050,430
VALVE
Filed Oct. 19, 1934
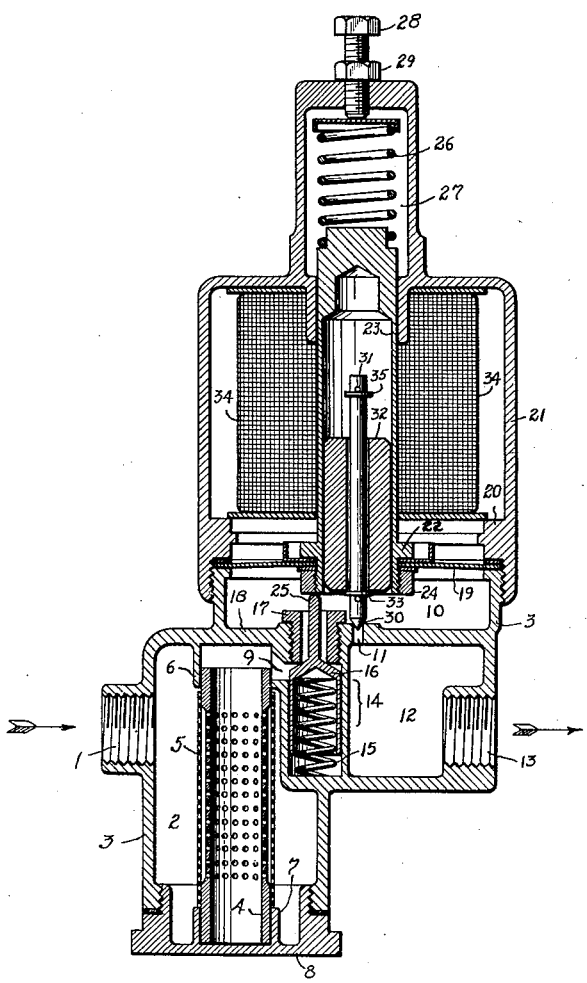
INVENTOR.
JOHN ERICKSON
BY
ATTORNEYS.

Patented Aug. 11, 1936

2,050,430

UNITED STATES PATENT OFFICE 2,050,430

VALVE

John Erickson, Troy, N. Y.

Application October 19, 1934, Serial No. 749,005

6 Claims. (Cl. 137—139)

This invention relates to valves, and more particularly to the combination of valves of different character in a single unit.

It is an object of the invention to provide a single valve unit which will strain the incoming fluid, reduce the pressure of the incoming fluid, automatically maintain the discharge pressure at a desired constant value and positively start or stop the flow of fluid whenever it is so desired.

A feature of the invention resides in combining a straining element, a pressure regulating valve, and a positively operated shut-off valve in a single, compact, unit.

Another feature of the invention resides in the use of a diaphragm which serves both as an operating element for the pressure regulator valve, and as a seal between a water chamber and an electric solenoid chamber.

Still another feature of the invention resides in the use of a floating armature casing which serves not only to guide the armature but, in addition, serves to transmit the force of a regulating spring to the regulator valve.

A further feature of the invention resides in positioning the shut-off valve between the pressure regulator and the valve outlet whereby the force necessary to open or close the shut-off valve is reduced to a minimum.

Another feature of the invention resides in the provision of a relatively large straining chamber from which the strainer element may be easily and readily removed, either to be cleaned, or to be renewed.

Other objects and features of the invention making for compactness in design, efficiency in operation, and economy in manufacture will be more apparent from the following description, to be read in connection with the accompanying drawing.

The figure is a sectional elevational view of a valve structure incorporating the features of the invention.

In general, the valve shown in the drawing combines three elements, namely a strainer, a pressure regulator valve, and a power operated shut-off valve. Water, or other fluid, is admitted from any desired source, for example, a city water main, through an inlet 1, into the straining chamber 2 of the lower valve casing 3.

The strainer, comprising a perforated cylinder 4 covered with wire gauze, or other straining material 5, is held at its upper end in an annular flange 6, and at its lower end in an annular flange 7. If desired, the cylinder 4 may be omitted, but in such case some means for stiffening the straining material must be provided. As can be seen, the lower flange 7 is formed on the inside of a relatively large cap 8. Preferably the cap is threaded into the base of chamber 2 in order that it may be easily removed whenever the strainer needs to be cleaned or to be replaced.

Since the ends of the cylinder 4 are snugly fitted into their respective guide flanges, it is evident that the water in chamber 2 must pass through the strainer, whence it flows through passageway 9, pressure regulating chamber 10, passage 11, discharge chamber 12, and through outlet 13 to any desired point of usage.

A pressure regulating, or throttling valve, generally designated 14, is interposed in the passageway 9 for the purpose of controlling the flow of fluid into chamber 10. While this valve may be constructed in any desired manner, the preferred form includes a light spring 15, a closure member 16, and a hollow plug 17, the lower face of which serves as a seat for closure member 16. For purposes of simplicity in assembly the plug 17 is threaded into partition 18.

The top of the regulating chamber 10 is defined by a flexible diaphragm 19, which diaphragm not only prevents the passage of water from chamber 10 into the solenoid casing 21, but also serves to control the operation of valve 14 as will hereinafter be made clear. Preferably the diaphragm is held at its outer periphery between the rim of the lower casing 3 and a flange 20, formed on the inside of the solenoid casing 21. In a similar manner the inner periphery of the diaphragm is gripped between a flange 22, formed on the outer surface of armature casing 23, and a suitable nut 24, which is threaded thereto.

As can be seen in the figure, spring 15 tends to force the closure member 16 towards its seat, thus to reduce the flow through the valve. In order to open the valve the closure member 16 must, of course, be depressed against the tension of spring 15. To accomplish this, the closure member is provided with a stem 25 which extends through the hole in plug 17, and terminates adjacent nut 24. Thus any downward movement of the diaphragm will be transmitted through stem 25 to cause an opening of the valve 14. This downward movement is accomplished by means of a relatively heavy spring 26 mounted in a chamber 27, and held in compression between the upper end of the armature casing 23, and the lower end of an adjusting screw 28. The adjusting screw may be locked in any desired position by means of nut 29. Water in chamber 10 exerts a pressure against diaphragm 19, thus creating an upward force against spring 26. If this upward force exceeds the downward force in the spring, then it is evident that the diaphragm will be lifted, whereupon spring 15 will force closure member 16 towards its seat thus to reduce the flow of water into chamber 10. Conversely, if the upward force is less than the downward force, the spring 26 will tend to open valve 14. Thus, the valve discharge pressure may be set at any desired point (below the inlet pressure) by adjustment of spring 26; and for any selected setting the valve will maintain a constant discharge pressure regardless of supply pressure variation, or discharge volume variations.

For the purpose of positively starting, or stopping, the flow of fluid whenever such action is desired, a shut-off valve is provided. Thus when the properly sharpened end 30 of a pin 31 is seated in the upper end of passageway 11, the flow through the valve will be completely terminated; and conversely, when the pin is removed from its seat a flow through the valve will be established.

While any one of several means might be used for operating the pin 31, an electric solenoid is preferred. Thus, a heavy armature 32 is fitted on pin 31, in such manner that it may slide along the pin within the limits defined by collars 33 and 35; and the armature is, in turn, loosely fitted within the armature casing 23. In its lower position, as illustrated, the armature rests on the collar 33, and by its weight holds the end 30 of pin 31 firmly on its seat. Further, since the armature fits loosely over the pin, and within its casing, the water pressure in the upper part of the armature casing will be equal to the water pressure in chamber 10; and this pressure, acting upon the upper end of pin 31, aids in maintaining the valve in closed position.

Whenever the solenoid coil 34 which is mounted within solenoid casing 21, surrounding armature casing 23, is energized, the armature is lifted; and as the armature passes the point of maximum magnetic intensity, it strikes upper collar 35, thereby lifting the pin from its seat and establishing a flow through the valve. Upon the deenergization of the solenoid the armature falls by gravity, strikes the lower collar 33 and forces pin 31 against its seat. It is apparent, then, that armature 32 always attains some momentum before it acts upon pin 31. The resulting hammer action assures a certain opening and a perfect closing of the shut-off valve.

As was previously explained, the fluid pressure within the armature casing assists in maintaining the shut-off valve in closed position. Consequently this force must be overcome in order to open the valve. Once the valve is opened the flow of water through passage 11 has some tendency to draw pin 31 towards its seat; and if this tendency is very marked, then the valve may chatter. Both of these effects are dependent upon the pressure of water in chamber 10. By placing the stop valve on the low pressure side of the pressure regulator valve, it is apparent that both of these effects are reduced. Therefore less power will be required to open the valve, and to maintain it in its open position without chattering, than would be possible with any other arrangement.

By way of summarization, solenoid 34 is energized for the purpose of opening the shut-off valve, thereby to establish a flow of fluid at line pressure, 100#/square inch for example, into chamber 2. Any well known device such as a hygrostat may be employed in the solenoid circuit.

The pressure at which water will be discharged from the valve is determined by an adjustment of spring 26 as hereinbefore explained. If the pressure in chamber 10 falls below this desired value because of the change in line pressure, or a change in the volume of water utilized at the point of discharge, the downward force of spring 24 will overcome the upward force of water acting on the diaphragm. Hence closure member 16 will be moved away from its seat to insure the flow of fluid into the chamber. If the resulting pressure in the chamber exceeds the desired value, then the diaphragm will compress spring 24 and allow spring 15 to close valve 14. The deenergization of the solenoid at any time will result in the seating of pin 31, and a complete stoppage of flow through the valve.

Since certain changes may be made in the construction of the valve without in any way departing from the scope of the invention, it is intended that the foregoing matter shall be construed in an illustrative, and not in a limiting sense.

I claim:—

1. In a valve assemblage, a casing, an inlet for admitting fluid to said casing, an outlet for discharging fluid from the casing, a pressure regulating chamber, a pressure regulator valve for controlling the admission of fluid to said chamber, a spring for closing said regulator valve, a spring for opening said valve, a flexible diaphragm for controlling the operation of said valve in response to pressure changes within said chamber, a shut-off valve between said chamber and said outlet, a solenoid coil, an armature for operating said shut-off valve responsive to the energization of said solenoid coil, and a floating armature casing extending through said diaphragm, said armature casing serving to transmit the forces of said second mentioned spring to said pressure regulator valve.

2. In a valve assemblage, a casing having an inlet and an outlet for fluid, a pressure regulating chamber, a pressure regulator valve for controlling the admission of fluid to said chamber, a spring for closing said regulator valve, a spring for opening said regulator valve, a flexible diaphragm forming a wall of said chamber and serving to control the operation of said regulator valve in response to pressure variations in the chamber, a shut-off valve between the chamber and the outlet from the casing, a solenoid, an armature, for operating said shut-off valve in response to the energization of said solenoid, an armature casing fastened to and movable with said diaphragm, said armature casing and diaphragm serving to seal said chamber, said casing serving also to transmit the force of said second mentioned spring to said regulator valve.

3. In a valve assemblage, a casing having an inlet and an outlet for fluid, a strainer, a pressure regulating chamber, a pressure regulator valve for controlling the admission of fluid to said chamber, a spring for closing said regulator valve, a spring for opening said regulator valve, means for adjusting the tension of said last mentioned spring, a flexible diaphragm forming a wall of said chamber and serving to control the operation of said regulator valve, a shut-off valve, a solenoid coil, an armature for operating said shut-off valve in response to the energization of said coil, an armature casing fastened to and movable with said diaphragm, said armature casing and diaphragm, serving to seal the chamber from said coil, and serving also to transmit the force of the last mentioned spring to said regulator valve.

4. In a valve assemblage, a casing, an inlet for admitting fluid to said casing, an outlet for discharging fluid from said casing, a pressure regulating chamber, a pressure regulator valve for controlling the admission of fluid to said chamber, means for operating said valve comprising a flexible diaphragm forming a part of said chamber, a shut-off valve in the line of flow between said inlet and outlet, means for operating said shut-off valve comprising a solenoid coil and an armature, and a casing for said armature, said last mentioned casing being formed as a part of said diaphragm.

5. In a valve assemblage, a casing, an inlet for admitting fluid to said casing, an outlet for discharging fluid from said casing, a shut-off valve in the line of flow between said inlet and outlet, means for operating said shut-off valve comprising a solenoid coil and an armature, a pressure regulating chamber, a pressure regulating valve for controlling the admission of fluid to said chamber, means for operating said pressure regulating valve including a diaphragm in said chamber, said diaphragm also serving as a seal between said chamber and said solenoid.

6. In a valve assemblage, a solenoid casing, a valve casing having an inlet for admitting fluid thereto and an outlet for discharging fluid therefrom, a pressure regulating chamber located in the line of fluid flow between said inlet and said outlet, a pressure regulator valve for controlling the admission of fluid from said inlet to said chamber, a spring in the valve casing for closing said regulator valve, a spring in said solenoid casing for opening said regulator valve, means for adjusting the tension of the last mentioned spring, a flexible diaphragm for controlling the operation of said regulator valve, a shut off valve, an armature for operating said shut off valve, an armature casing secured to and movable with said diaphragm, and a solenoid coil in said solenoid casing surrounding said armature casing, said diaphragm and solenoid casing being so mounted as to form a fluid-tight seal between the valve and solenoid casings, said armature casing serving additionally to transmit the force of the last mentioned spring to the regulator valve.

JOHN ERICKSON.